(No Model.)
F. J. BECKER.
FERTILIZER DISTRIBUTER.
No. 532,632. Patented Jan. 15, 1895.
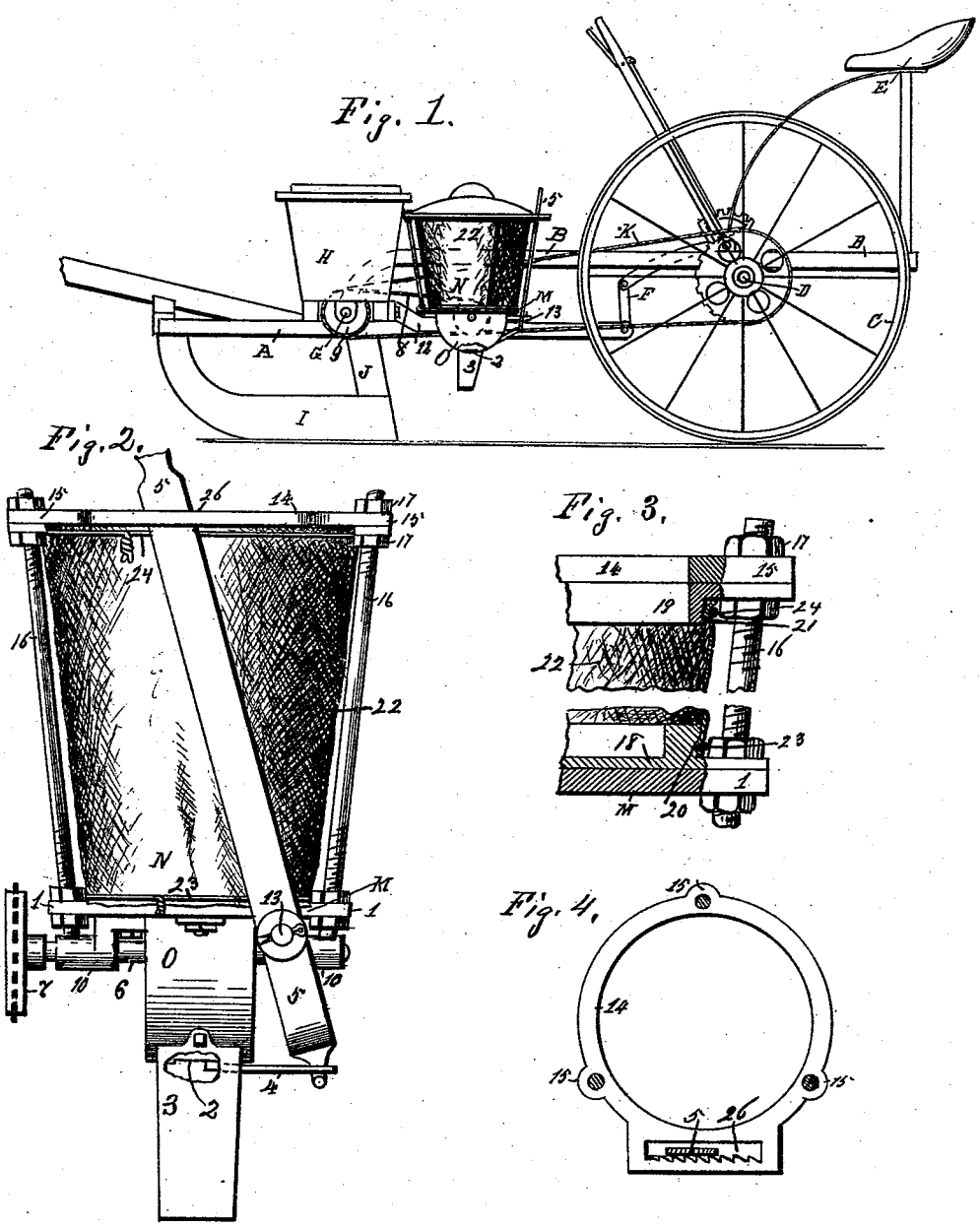
Witnesses:
E. R. Shipley
J. J. Richardson
Frank J. Becker  Inventor
By Robert S. Carr
his Attorney

UNITED STATES PATENT OFFICE.

FRANK J. BECKER, OF HAMILTON, OHIO, ASSIGNOR TO THE H. P. DEUSCHER COMPANY, OF SAME PLACE.

FERTILIZER-DISTRIBUTER.

SPECIFICATION forming part of Letters Patent No. 532,632, dated January 15, 1895.

Application filed July 28, 1894. Serial No. 518,839. (No model.)

*To all whom it may concern:*

Be it known that I, FRANK J. BECKER, of Hamilton, Butler county, Ohio, have invented certain new and useful Improvements in Fertilizer-Distributers, of which the following is a specification.

My invention relates to that class of fertilizer distributers that may be attached to corn planters or other implements, and the objects of my improvement are to provide the fertilizer hopper or receptacle with walls of textile fabric or other appropriate flexible material to prevent the contents from becoming packed or arched over the feeding mechanism, and to provide adjustments whereby the tension of said walls may be regulated. These objects are attained in the following described manner as illustrated in the accompanying drawings, in which—

Figure 1 is a side elevation of a corn planter with fertilizer distributer attached; Fig. 2, an enlarged rear elevation of the distributer, and Figs. 3 and 4 details of construction.

In the drawings, A represents the runner frame of a corn planter; B, the main frame coupled thereto in the usual manner and mounted on ground wheels C by a rotative axle D. The driver's seat E and lever mechanism F to adjust the runner frame, are attached to the main frame. Seed shaft G on the runner frame engages with seed dropping mechanism in the seed boxes H thereon. Runners I open the furrows in the ground and seed spouts J thereon register with openings in the bottom of the seed boxes that communicate with the dropping mechanism therein. Drive chain K is actuated by a sprocket wheel on the axle to rotate the seed shaft.

The circular metal base M of the distributer is formed with lugs 1 that project from different parts of its edge. It contains a large central opening to admit the contents of the hopper N to the feed cup O. Said feed cup is of semi-cylindrical form and is attached to the under side of the base plate, the lower portion of the cup being shown broken away in Figs. 1 and 2. It is formed with an opening 2 in its bottom for the passage of the fertilizer into spout 3 and thence into the furrow. Said opening 2 is regulated in size by sliding gate 4 that is movable by means of fulcrumed hand lever 5. Feed shaft 6 is provided on one end and beyond the base plate with a sprocket wheel 7 by which it is rotated by means of chain 8 that engages with a corresponding sprocket wheel 9 on the seed shaft of the corn planter. Said shaft 6 is extended through the feed cup O in the line of its axis and is journaled in bearings 10 that are fastened to the under side of the base plate and on opposite sides of the feed cup. The front ends of said bearings are extended and terminate in the form of brackets 12 to facilitate the attachment of the distributer to the corn planter. The rear end of one of said bearings is extended and terminates in wrist pin 13 whereon the hand lever 5 is fulcrumed.

The top 14 of the hopper consists of a metal ring formed with projecting lugs 15 wherein the top portion of supporting rods 16 are adjustably secured by means of nuts 17 movable thereon. The lower extremity of said supporting rods are secured in a similar manner in the corresponding lugs 1 on the base plate. This manner of supporting the top of the hopper above the base plate is substantial and permits of its adjustment more or less from said plate. An annular flange 18 is formed integral on the base plate or formed separately and secured thereon by the nuts on the supporting rods. A similar flange 19 depends from the under side of the top 14 of the hopper and may be integral therewith or attached thereto by the nuts on the top portion of the supporting rods. The edges of said flanges 18 and 19 diverge to form shallow peripheral grooves 20 and 21 contiguous to the respective members to which they belong. A tube 22 formed of cotton duck or other suitable textile fabric forms the side walls of the hopper. The ends of said tube are left open and one end is preferably of larger diameter than the other to give a desirable taper to the shape of the hopper. Said tube is secured with its respective extremities drawn tightly over flanges 18 and 19 and occupies the distance between the top 14 of the hopper and the base plate. Wire bands 23 and 24 are tightly drawn around the extremities of the tube 22 and within the respective grooves 20 and 21 to hold them securely in place. By adjusting the top of the hopper on the supporting rods 16 the flexible sides of the tube 22 may be drawn to any desired tension.

The feeding mechanism usually consists of a series of pins radiating from the feed shaft and within the feed cup and movable with the rotation of the shaft to evenly sift the fertilizer through the bottom opening of the cup. The top portion of hand lever 5 is extended through and guided in its movements by slot 26 formed in a projection of top 14 of the hopper.

Brackets 12 serve to conveniently fasten the distributers to the rear portion of the runner frame and just behind the respective seed boxes thereon.

Distributer hoppers are usually constructed of wood or metal and are unyielding and rigid. They permit the contents to become packed and frequently arched over the feeding device which interferes with its even distribution. This objection is avoided by providing the hopper with flexible sides that quiver or vibrate during the jolting due to the movement of the planter and thus keep the contents from becoming packed or arched that it may descend steadily to within the action of the feeding mechanism. By the adjustment of the top 14 of the hopper the tension of its sides may be regulated as desired.

Having fully described my improvements, what I claim as my invention, and desire to secure by Letters Patent, is—

1. The combination, with a top and a base plate, each having a flange, of a flexible sided hopper secured at its ends to said flanges, rods for supporting the top plate and adjusting the tension of the sides of the hopper, and an agitator within the lower end of the hopper, substantially as set forth.

2. The combination, with a top and a base plate, each having a flange, the periphery of which flange is provided with a shallow groove, of a flexible sided hopper upon the flanges, a wire band around each flange to bind each end of the hopper within its respective groove, and means for supporting the top plate and adjusting the tension of the sides of the hopper, and an agitator within the lower end of the hopper, substantially as set forth.

3. The combination, with a base plate, the under side of which is provided with bearings, the front ends of which bearings are extended to form a means of attaching it to the frame of a corn planter, and one of said bearings extended to the rear to form a wrist pin, of a hopper upon the plate, a feed cup upon the lower side of the base plate provided with an opening in its bottom, a lever pivotally secured to the wrist pin and provided with means for regulating the size of the opening, and a shaft journaled in the bearing of the base plate, and means for operating the same, substantially as set forth.

FRANK J. BECKER.

Witnesses:
C. H. SCHELL,
ROBERT S. CARR.